United States Patent [19]

Patalon et al.

[11] Patent Number: 4,568,278

[45] Date of Patent: Feb. 4, 1986

[54] CHARGING AND DISCHARGING DEVICE FOR HEATING FURNACES, ESPECIALLY CONTINUOUS BOGIE HEARTH FURNACES AND ROTATING HEARTH FURNACES

[75] Inventors: Heinrich Patalon, Bochum; Alfred Mues, Rheine, both of Fed. Rep. of Germany

[73] Assignee: Rheiner Maschinenfabrik Windhoff, Rheine, Fed. Rep. of Germany

[21] Appl. No.: 635,355

[22] Filed: Jul. 27, 1984

[30] Foreign Application Priority Data

Aug. 10, 1983 [DE] Fed. Rep. of Germany ....... 3328814

[51] Int. Cl.[4] .......................... F27B 9/16; B65G 25/00

[52] U.S. Cl. .................................... 432/138; 414/180; 414/184

[58] Field of Search ................ 432/138; 414/180, 182, 414/184, 186, 198

[56] References Cited

U.S. PATENT DOCUMENTS 2,368,615 2/1945 Reese ................................. 414/186
2,605,006 7/1952 Barnes ................................. 414/182
2,622,861 12/1952 Talley ................................. 432/138
4,412,813 11/1983 Wulf ................................. 432/138
4,453,876 6/1984 Arpin ................................. 414/182

OTHER PUBLICATIONS

Didier Engineering GmbH paper entitled, "The Continuous Car Type Furnace (CCT Furnace), a New Continuous Reheating Furnace for Rolling Mills and Force Plants".

Didier Engineering GmbH brochure entitled, "Information", dated May 1982, relating to a Continuous Car Type Furnace (CCT Furnace) for Plate, Section, Tube Rolling Mills and Forges.

*Primary Examiner*—John J. Camby

*Attorney, Agent, or Firm*—Merchant, Gould, Smith, Edell, Welter & Schmidt

[57] ABSTRACT

The invention relates to a charging and discharging device with a vertically and longitudinally movable supporting arm. According to the invention, a pivotable lifting fork is provided which is fastened, horizontally and rotatably about its longitudinal axis, to the free ends of a supporting arm extending essentially in the form of a U and open at the bottom.

8 Claims, 3 Drawing Figures

CHARGING AND DISCHARGING DEVICE FOR HEATING FURNACES, ESPECIALLY CONTINUOUS BOGIE HEARTH FURNACES AND ROTATING HEARTH FURNACES

BACKGROUND OF THE INVENTION

The invention relates to a charging and discharging device for heating furnaces, especially continuous bogie hearth furnaces and rotating hearth furnaces.

Charging and discharging machines for continuous bogie hearth furnaces and rotating hearth furnaces are known, and these have liftable or pivotable manipulator arms with lifting forks or tongs.

The manipulator arms and lifting forks partially project with their active region from the suspension supporting them, to such an extent that they are lowered somewhat, via this region and thereby, when the material to be heated is transferred to the individual hearth bogies or onto the beds of the rotating hearth furnace, release the individual slabs, billets or the like so that they are tilted, with the result that they first come up against the ceramic bed by one edge only and can very easily damage the bed as a result of the surface pressures arising thereby. When two slabs, billets or the like are seized directly in succession by the charging device and also released at the same time, under certain circumstances, the second billet or the like, when transferred to the ceramic bed, can hang freely in the air while the first billet already touches the bed, with the result that the second billet covers a certain distance in freefall before it strikes the ceramic bed. The possible damage to the ceramic beds which arises thereby results in long shutdown and repair times and consequently high costs.

The smaller the lifting height and traveling distances of devices of this type can be made, the simpler becomes the sealing off from the furnace walls, which is absolutely necessary to ensure as low heat losses as possible. Also, it is possible to maintain rapid cycle times more easily. Moreover, less drive and braking power is required.

A disadvantage of the gripping tongs which are sometimes used is that the material to be heated must be positioned on the hearth bogies or on the beds of the rotating hearth furnaces at a relatively great distance, so that the gripping tongs of the charging and discharging devices can pass through between the individual parts of the deposited material to be heated and can grasp individual billets or the like. Particularly in rotating hearth furnaces, in which these distances have to be ensured between in individual billets or the like even in the inner radius of the rotating hearth, this results in an undesirably large unoccupied area of the rotating hearth, especially in the outer regions.

The feed systems for the proposed charging and discharging devices are relatively expensive because of the use of lifting prisms or the like.

The following is based, in particular, on a charging and discharging device with one or more vertically and longitudinally movable supporting arms.

The requirements for maintaining short cycle times, low heat losses, the gentlest possible depositing of the material to be heated on the ceramic beds and simple design and operation are each only partially satisfied by the known devices.

SUMMARY OF THE INVENTION

The object on which the invention is based is, therefore, to satisfy all these requirements at the same time and in the best possible way, both for continuous bogie hearth furnaces and for rotating hearth furnaces.

The object on which the invention is based is achieved by means of a pivotable lifting fork. The pivotable design of the lifting fork results in a direction of movement which acts in addition to the longitudinal mobility of the charging or discharging device as a whole, without this entire device having to be made movable in the additional direction of movement.

Further advantageous designs of the charging and discharging device emerge from the sub-claims.

Thus, for example, the supporting arm is preferably made similar to a U open at the bottom, the lifting forks being attached to a tube mounted rotatably in the two lower ends of the U-legs and interacting with grooves on the top side of the ceramic beds matching the lifting forks and located on the top side of the hearth bogies or the rotating hearth.

BRIEF DESCRIPTION OF THE DRAWINGS

An exemplary embodiment of the charging and discharging device according to the invention is explained in more detail with reference to the drawings in which.

DETAILED DESCRIPTION OF THE INVENTION

Figure 1:
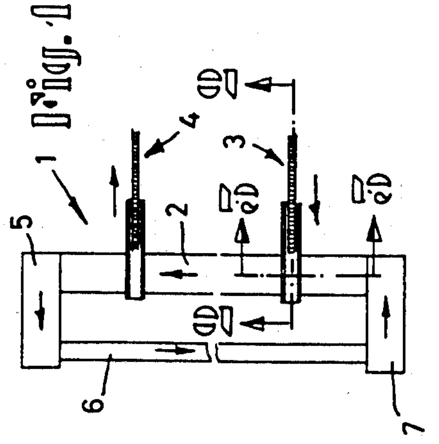
FIG. 1 shows diagrammatically the basic design of an apparatus known per se which is intended for heating slabs, billets or the like, but in which the charging and discharging device according to the invention is used.

In FIG. 1, 1 designates as a whole an apparatus for heating billets, slabs or the like, consisting of an actual furnace 2 through which movable hearth members, and in particular hearth bogies (not shown) are pushed to follow a predetermined path of travel in the direction of the arrow. The hearth bogies (not shown) are loaded by a charging device 3 and are unloaded again at the end of the furnace by a discharging device 4.

After leaving the furnace 2, the hearth bogies pass onto a cross-sliding platform 5, by means of which they are displaced transversely to their previous direction of travel and pass onto a return track 6. This return track 6 transports the hearth bogies in the opposite direction to the direction of travel through the furnace to a cross-sliding platform 7 which shifts the hearth bogies towards the entrance of the furnace 2. There, the circuit begins again in the direction of the respective arrows.

Figure 2:
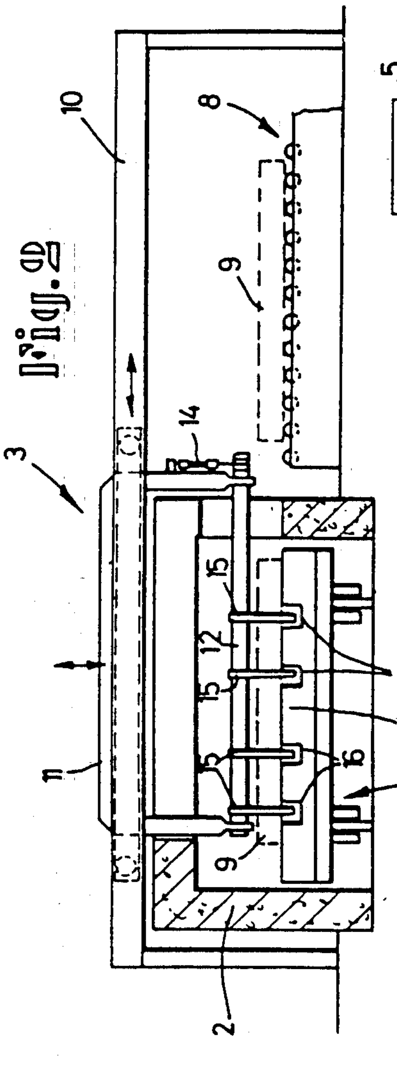
FIG. 2 shows a section along the line 2—2 in FIG. 1 on a larger scale.

FIG. 2 shows, on a larger scale, a cross-section through the furnace 2 in the region of the charging device 3. By means of a roller table 8 located outside the actual furnace 2, the material to be heated 9 is transported near to the furnace 2 up to a point predetermined by stoppers (not shown). Arranged on a runway 10 aligned transversely to the longitudinal axis of the furnace 2 above the latter is a supporting arm 11 which is mounted in a way known per se so as to be longitudinally movable along the runway 10 in a direction generally perpendicular to the path of travel of the movable hearth members. The drive means for this purpose and for achieving a slight lifting movement of the supporting arm 11 are not shown for the sake of clarity.

The supporting arm 11 has the form of an inverted U, open at the bottom, an essentially horizontally extending tube 12 being mounted rotatably on the lower free ends of the two legs of the U and being arranged pivotably by means of a hydraulic cylinder 14 fastened between the supporting arm 11 and the tube 12. As shown in FIG. 2, hydraulic cylinder 14 is positioned along and adjacent to one leg of the supporting arm 11. Together with several spaced tongs 15 attached thereto, the tube 12 forms a lifting fork, the tongs 15 being arranged so that they can interact with grooves 16 in ceramic beds 17 of hearth bogies 18 which match the spacing of the tongs, in such a way that they can penetrate into these grooves 16 and can grasp by means of a pivoting movement billets or the like which lie transversely to the direction of travel of the hearth bogies 18.

The vertical adjustability of the supporting arm 11 is calculated so that, when the tongs 15 are swung up and the supporting arm 11 is lowered, the lowest points of the tongs 15 are located above the beds 17 of the hearth bogies, and so that, when the tongs 15 are swung down, but with the supporting arm 11 raised, the lowest points of the tongs 15 are likewise located above the beds 17 of the hearth bogies 18. Consequently, in these positions, the charging and discharging device can be moved without difficulty.

A charging operation takes place as follows:

With the tongs 15 swung up, the supporting arm 11 moves, in the lowered position, out of the furnace 2 and over the roller table 8, until the tongs 15 are located above prepositioned material to be heated 9. The distances between the individual rollers of the roller table 8 are calculated so that the tongs can be pivoted through between these rollers. When the tongs 15 are swung in the supporting arm 11 is raised, the material to be heated 9 is grasped and subsequently moved into the furnace 2. After the end position has been reached, the supporting arm 11 is lowered, the tongs 15 penetrating into the grooves 16 between the ceramic beds 17 of the hearth bogie 18. The material to be heated is thereby deposited gently on the beds 17, and the position of the material to be heated can be fixed by means of an appropriately profiled surface on the ceramic beds.

After the tongs 15 have been swung out of the grooves 16, with the supporting arm 11 lowered, the entire charging machine 3 can be moved laterally out of the furnace 2, while the hearth bogies 18 advance one division. The cycle described subsequently begins again.

Figure 3:
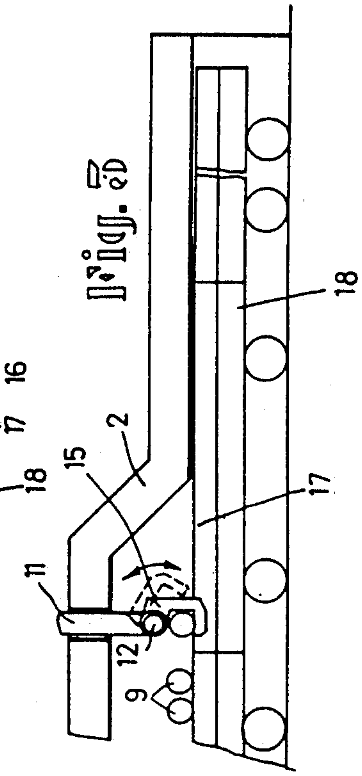
FIG. 3 shows a section along the line 3—3 in FIG. 1.

As can be seen, in particular, from FIG. 3, the newly introduced pieces are added from outside to the material to be heated 9 which is already deposited. Because this is not carried out by means of tongs, only a short distance between the individual pieces of material to be heated is required.

The furnace is discharged in the same way in reverse order, and in the discharging device 4 the tongs 15 open in exactly the opposite way to those of the charging device 3, so that, here, the pieces of material to be heated 9, which are to be extracted, are removed from outside, and here too there is no need for a great distance between the individual pieces.

Furthermore, it can be seen clearly in FIG. 3 that the region of the furnace 2 located behind the discharging device 4 has a very low ceiling which is brought close to the surface of the ceramic beds 17 of the hearth bogies 18, so that there is no longer any need for doors here to ensure good heat-sealing of the furnace. The region of the furnace 2 located in front of the charging device 3 is also designed correspondingly.

Furthermore, in contrast to the exemplary embodiment illustrated, it is possible to use a rotating hearth furnace instead of the continuous bogie hearth furnace illustrated, in which case the hearth of the rotating hearth furnace must have beds arranged annularly and grooves 16 illustrated, the pivotable tongs 15 being able to penetrate into these and swing out of them, as described above.

The forces to be exerted in order to rotate the tube 12 and pivot the tongs 15 are relatively slight, and also the forces to be exerted in order to move and lift the device as a whole are so slight that they can be exerted without difficulty by relatively small motors. Furthermore, the construction of the actual charging and discharging machine is extremely simple and, moreover, does not require any expensive feed devices. Because of the simple movements to be executed and the short distances and because the actual charging and discharging machine can be moved immediately after the tongs 15 have been swung up, extremely short cycle times become possible. At the same time, the short travel of the device as a whole also simplifies heatsealing, so that good thermal insulation of the furnaces can be achieved in conjunction with the furnace ends which are drawn down.

The requirements for ever increasing processing capacities and short cycle times resulting thereby, for low heat losses, for the gentlest possible depositing of the material to be heated on the ceramic beds, and for simple design and operation are satisfied in combination by means of the proposed device.

I claim:

1. A charging and discharging device for heating furnaces, especially continuous bogie hearth furnaces and rotating hearth furnaces having movable hearth members which follow a predetermined path of travel, comprising:

a vertically and longitudinally movable supporting arm, said supporting arm having an inverted, essentially U-shaped structure including two legs and an open end therebetween, each of said legs having a free end;

a lifting fork mounted rotatably at said open end on said free ends of said legs of said supporting arm, said lifting fork having a tube rotatable about its longitudinal axis with spaced tongs attached thereto; and means for pivoting said tube and said tongs.

2. A device according to claim 1, wherein said tube is aligned essentially horizontally.

3. A device according to claim 1, further comprising a runway aligned transversely to and above the longitudinal axis of a furnace, said runway guiding said supporting arm so that said supporting arm can be moved into and out of said furnace perpendicularly to said path of travel.

4. A device according to claim 1, further comprising said movable hearth members having a topside including ceramic beds, said ceramic beds having grooves therein which match the spacing of said tongs such that said tongs pivotably penetrate into said grooves to grasp material to be heated lying transversely to said path of travel of said movable hearth members.

5. A device according to claim 4, wherein said topside of said movable hearth members has a profile therein which matches the material to be heated, said profile extending transversely to said path of travel of said movable hearth members.

6. A device according to claim 1, wherein said means for pivoting said tube and said tongs includes a hydraulic cylinder positioned along and adjacent to one of said legs of said supporting arm.

7. A device according to claim 1, further comprising a roller table, said roller table located proximate a furnace, whereby material to be heated in said furnace is grasped by said tongs on said table.

8. A device according to claim 7, wherein said roller table includes stoppers, said stoppers serving to position said material to be heated in synchronism with said lifting forks.

* * * * *

UNITED STATES PATENT AND TRADEMARK OFFICE
CERTIFICATE OF CORRECTION

PATENT NO. : 4,568,278

DATED : Feb. 4, 1986

INVENTOR(S) : Heinrich Patalon et al

It is certified that error appears in the above-identified patent and that said Letters Patent is hereby corrected as shown below:

Title page:

The Assignees should be listed as follows:

-- Didier Engineering GMBH, Essen;
Rheiner Maschinenfabrik Windhoff
Aktiengesellschaft, Rheine, Fed. Rep.
of Germany --.

Signed and Sealed this

Twenty-seventh Day of January, 1987

*Attest:*

DONALD J. QUIGG

*Attesting Officer* *Commissioner of Patents and Trademarks*